(12) United States Patent
Moran et al.

(10) Patent No.: US 10,080,462 B2
(45) Date of Patent: Sep. 25, 2018

(54) SPRAYHEAD FOR A COFFEE BREWING MACHINE

(71) Applicants: Sean Martin Moran, Dublin (IE); Paul Drewry Pearson, County Donegal (IE); Paul Francis Stack, Dublin (IE)

(72) Inventors: Sean Martin Moran, Dublin (IE); Paul Drewry Pearson, County Donegal (IE); Paul Francis Stack, Dublin (IE)

( * ) Notice: Subject to any disclaimer, the term of this patent is extended or adjusted under 35 U.S.C. 154(b) by 65 days.

(21) Appl. No.: 14/862,414

(22) Filed: Sep. 23, 2015

(65) Prior Publication Data

US 2016/0081513 A1 Mar. 24, 2016

(30) Foreign Application Priority Data

Sep. 24, 2014 (GB) .................................. 1416863

(51) Int. Cl.
  *A47J 31/46* (2006.01)
  *A47J 31/44* (2006.01)
  *A47J 31/057* (2006.01)

(52) U.S. Cl.
  CPC ............. *A47J 31/46* (2013.01); *A47J 31/057* (2013.01); *A47J 31/4478* (2013.01)

(58) Field of Classification Search
  CPC ..................................................... A47J 31/46
  USPC ......................................................... 99/300
  See application file for complete search history.

(56) References Cited

U.S. PATENT DOCUMENTS

| 1,648,699 | A | | 11/1927 | Shroyer |
| 4,713,253 | A | * | 12/1987 | Stone, Jr. ............... A47J 31/103 426/433 |
| 5,028,753 | A | * | 7/1991 | Shariat .................. A47J 31/547 219/689 |
| 5,460,078 | A | | 10/1995 | Weller et al. |
| 5,910,205 | A | | 6/1999 | Patel |
| 2016/0058240 | A1 | * | 3/2016 | Nam .................... A47J 31/4478 99/285 |
| 2016/0213193 | A1 | * | 7/2016 | Liu .......................... A47J 31/54 |

FOREIGN PATENT DOCUMENTS

| DE | 7811283 | | 7/1978 | |
| FR | 2640486 | | 6/1990 | |
| GB | 1443939 A | * | 7/1976 | ............... G05D 9/02 |
| GB | 1497273 A | * | 1/1978 | ............. E03D 1/141 |
| GB | 2416481 | | 1/2006 | |
| JP | 2006-198213 A | | 8/2006 | |

* cited by examiner

*Primary Examiner* — Ibrahime A Abraham
*Assistant Examiner* — Spencer H Kirkwood
(74) *Attorney, Agent, or Firm* — Fulwider Patton LLP

(57) ABSTRACT

A sprayhead for a pour over coffee brewing machine for delivering hot water to coffee grounds held in a brew basket therebelow, has a housing with a water inlet at one end thereof, which is connectable to an intermittent source of hot water. A holding chamber for accumulating a quantity of hot water therein is located within the housing and is connected to the water inlet. A dispensing chamber is located within the housing and below the holding chamber, in use. A bell siphon located in the holding chamber delivers the accumulated quantity of water from the holding chamber to the dispensing chamber, and then to the coffee grounds, once the water level in the holding chamber rises above an open end of a siphon tube.

2 Claims, 5 Drawing Sheets

SPRAYHEAD FOR A COFFEE BREWING MACHINE

CROSS-REFERENCES TO RELATED APPLICATIONS

This application claims priority from Great Britain Application No. 1416863.7, filed Sep. 24, 2014, incorporated by reference in its entirety.

BACKGROUND

This invention relates to a sprayhead for a coffee brewing machine and, in particular, to a sprayhead for a pour over coffee brewing machine.

Pour over water coffee brewing machines are designed for both for the catering trade and for domestic use. Such machines use a holding tank pre-filled with water. In order to heat the water rapidly in a pour over water coffee brewing machine, a flash boiler, also known as a bubble pump, is commonly used. As the water is heated in the flash boiler a two phase mixture of gas phase and liquid phase water is created. As this two phase mixture is less dense than the equivalent volume of cold water, the heated water is pushed out of the boiler and on to the sprayhead of the coffee machine, which sprayhead is at a greater height than the water entering the flash boiler from the holding tank.

SUMMARY OF THE INVENTION

Thus, for example, the Filtro Flask Manual brewer manufactured by Marco Beverage Systems Limited, of Sandyford Business Park, Dublin 18, Ireland, has a brew capacity of 2.21 and incorporates a flash boiler with a power rating of 2.1 kW at 230 V. The flash boiler is located in the brewer housing below a water holding tank, which in turn is located below a sprayhead for delivering hot water to a brew basket. When the brewer is turned on, water is fed from the water holding tank to an inlet at the bottom of the flash boiler. The water in the boiler is heated rapidly and exits from an outlet located at the top of the boiler and is fed to a sprayhead, where it drips into a brew basket containing ground coffee.

In this brewer, as the water holding tank is located below the sprayhead energy is required to get the water up and out of the sprayhead. This energy comes from the heating of the water in the flash boiler. As the water heats it expands, as steam is generated. This forces the water out of the flash boiler and on to the sprayhead, for delivery to the brew basket.

Once the first volume of water has been delivered from the flash boiler it is refilled from the holding tank and the water is brought up to the required temperature so as to force it out of the flash boiler and on to the sprayhead.

Thus, the hot water from the flash boiler is delivered to the sprayhead as intermittent pulses of water, with the interval between pulses increasing as the coffee brewing proceeds. This intermittent delivery of hot water to the sprayhead results, in turn to an uneven flow of hot water from the sprayhead to the ground coffee contained in the brew basket.

The coffee brewing process proceeds in three stages namely, wetting, extraction and hydrolysis and an uneven flow of hot water onto the ground coffee can adversely affect each of these stages. Thus, the organoleptic characteristics of the brewed coffee are compromised.

It is an object of the present invention to overcome the disadvantages of the coffee brewing machine hereinbefore described.

Thus, the invention provides a sprayhead for a pour over coffee brewing machine for delivering hot water to coffee grounds held in a brew basket therebelow, the sprayhead comprising a housing, having a water inlet at one end thereof, the water inlet being connectable to an intermittent source of hot water, a plurality of spaced apart hot water outlets arranged at the other end of the housing, a holding chamber for accumulating a quantity of hot water therein, which holding chamber is located within the housing, is vented to the atmosphere and is connected to the water inlet, a dispensing chamber located within the housing and below the holding chamber, in use, and means for delivering the accumulated quantity of hot water from the holding chamber to the dispensing chamber from where it drips from the hot water outlets onto the ground coffee, in use, in a continuous flow of hot water, while the holding chamber is refilling with water.

An advantage of the sprayhead according to the invention is that once delivery of the hot water from the sprayhead commences it will continue at a steady rate, with some short breaks in flow, as the holding chamber refills, until all of the volume of hot water for a particular brew has been used. The dimensions of the holding chamber and the dispensing chamber, together with the flow rate from the holding chamber to the dispensing chamber and from the dispensing chamber to the coffee grounds, are chosen to provide the optimum flow of hot water from the sprayhead for a particular brewing process.

Preferably, the delivery means is a siphon arrangement connecting the holding chamber with the dispensing chamber, which siphon arrangement releases the accumulated quantity of water each time the holding chamber has filled with water.

An advantage of a sprayhead with a siphon arrangement is that the transfer of hot water from the holding chamber to the dispensing chamber is triggered by the siphon and does not require any moving parts or mechanical or electrical control.

In one embodiment of the invention, the siphon arrangement is of the bell siphon type with an upstanding open ended siphon tube located on a bottom surface of the holding chamber, in use, and is covered by a siphon bell, which siphon tube connects with the dispensing chamber, with the accumulated quantity of water being deliverable to the dispensing chamber once the water level in the holding chamber rises above the open end of the siphon tube.

An advantage of a bell siphon is that it is robust and is also easy to dismantle for cleaning or maintenance of the sprayhead.

In a further embodiment of the invention, the siphon arrangement is a curved siphon tube located within the holding chamber on the bottom surface thereof, in use, the siphon tube being connectable at one end thereof to the dispensing chamber, and being open at the other end thereof, with the open end being located close to the bottom surface and the siphon tube curving in an arc above the bottom surface, such that when the water level reaches the apex of the arc, the siphon will drain the accumulated water from the holding chamber into the dispensing chamber.

An advantage of a curved siphon tube arrangement is that it has only one part and takes up less space in the holding chamber than the bell siphon type.

In a further embodiment of the invention, a drain is located in the holding chamber, such that any hot water remaining in the holding chamber, at the end of the brewing process, will drain slowly therefrom.

An advantage of this arrangement is that no water will remain in the holding tank at the end of the brewing process. If some water were to remain in the holding chamber and to cool down therein, then the first volume of water delivered to the coffee grounds, during the next use of the coffee machine, would not be at the optimum brewing temperature.

Preferably, the drain connects the holding chamber with the dispensing chamber.

An advantage of the drain emptying into the dispensing chamber is that the total volume of water for a particular brew will be delivered onto the coffee grounds.

In a further embodiment of the invention, where the volume of water for a particular brew exceeds the accumulated volume of water, the dimensions of the holding chamber and the dispensing chamber, together with the flow rate from the holding chamber to the dispensing chamber and from the dispensing chamber to the coffee grounds are chosen to provide a pre-infusion pause after the initial water burst onto the coffee grounds, while the holding chamber refills with hot water.

An advantage of a pre-infusion pause is that the during this wetting stage, as the coffee grounds absorb the hot water, gas is driven from the coffee particles and from interstitial voids inside the coffee particles. This prepares the grounds for the extraction stage, which commences when the subsequent volume of hot water is dripped onto the coffee grounds.

In a further embodiment of the invention, means are provided for altering the volume of hot water, which can be accumulated in the holding chamber.

An advantage of a volume altering means is that the one sprayhead model can be adapted for installation on a variety of coffee machines.

Preferably, the volume altering means is an object, which is moveable, into and out of the holding chamber, so as to alter the internal dimensions thereof.

An advantage of a moveable object for altering the volume of hot water accumulated in the holding chamber is that the accumulated volume can be fine-tuned for a particular sprayhead application.

BRIEF DESCRIPTION OF THE DRAWINGS

The invention will be further illustrated by the following description of embodiments thereof, given by way of example only with reference to the accompanying drawings in which.

DETAILED DESCRIPTION OF THE PREFERRED EMBODIMENTS

Figure 1:
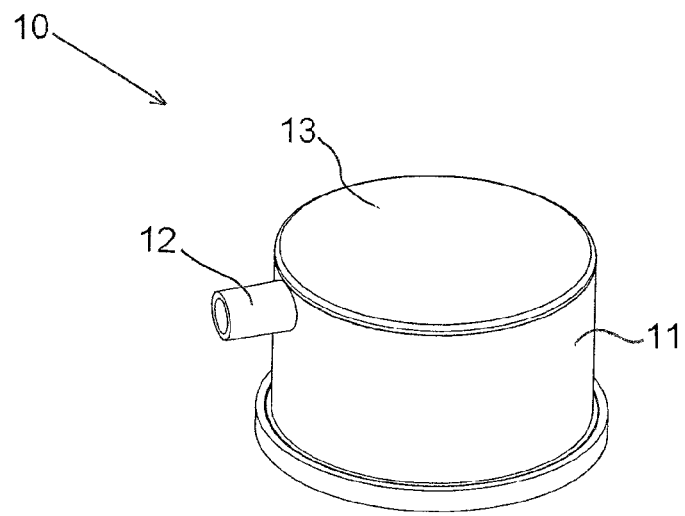
FIG. 1 is a perspective view of a sprayhead in accordance with the invention.

Referring to FIG. 1, there is illustrated generally at 10, a sprayhead for a pour over coffee brewing machine for delivering hot water to coffee grounds held in a brew basket therebelow, in accordance with the invention. The sprayhead 10 has a housing 11 having a water inlet 12 at one end 13 thereof, the water inlet 12 being connectable to an intermittent source of hot water.

Figure 2:
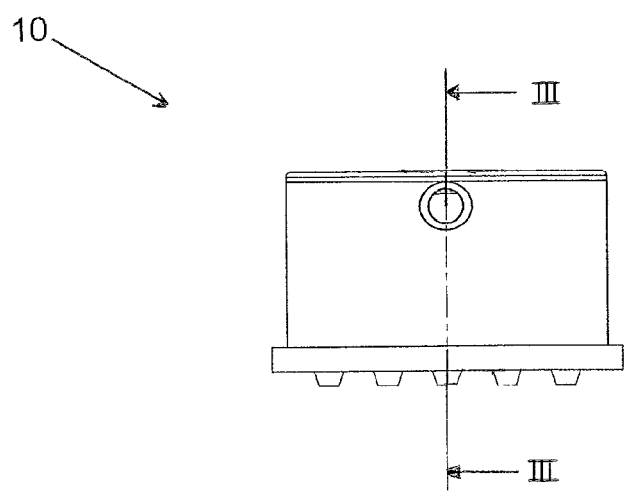
FIG. 2 is an elevation view of the sprayhead of FIG. 1.

Referring to FIG. 2 the sprayhead 10 is shown in elevation.

Figure 3:
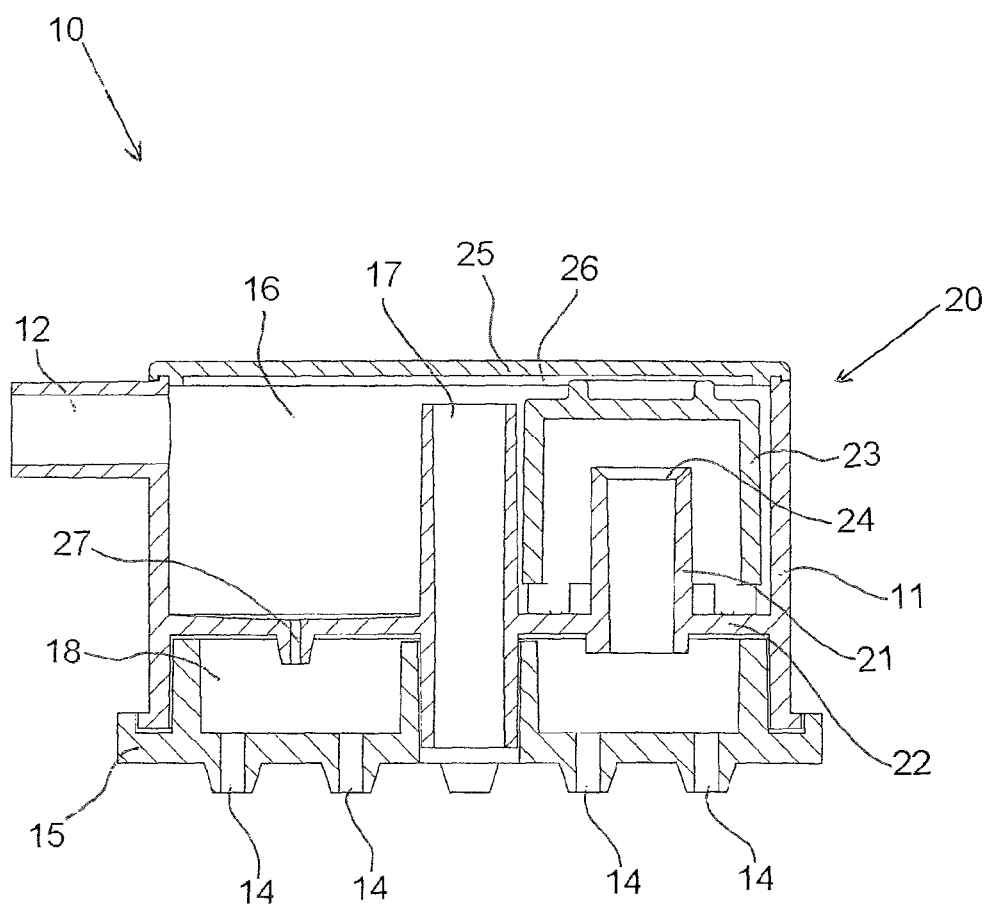
FIG. 3 is a section view on line III-III of FIG. 2.

Referring to FIG. 3, the sprayhead 10 is illustrated in a section view on line III-III of FIG. 2. A plurality of spaced apart hot water outlets 14 are arranged at the other end 15 of the housing 11. A holding chamber 16 for accumulating a quantity of hot water therein is located within the housing 11. The holding chamber 16 is vented to the atmosphere by a vent 17, which is centrally mounted on end 15. The holding chamber 16 is connected to the water inlet 12.

A dispensing chamber 18 is located within the housing 11 and below the holding chamber 16, in use. Means for delivering the accumulated quantity of water from the holding chamber 16 to the dispensing chamber 18, in the form of a bell siphon, shown generally at 20, is located in the holding chamber 16. The bell siphon 20 consists of an upstanding open ended siphon tube 21 located on a bottom surface 22 of the holding chamber 16 and is covered by a siphon bell 23. The siphon tube 21 connects the holding chamber 16 with the dispensing chamber 18, with the accumulated quantity of water being deliverable to the dispensing chamber 18 once the water level in the holding chamber 16 rises above open end 24 of the siphon tube 21.

A sprayhead cap 25 seals top 26 of the sprayhead 10.

A drain 27 is mounted in the bottom surface 22 of the holding chamber 16 and connects the holding chamber 16 with the dispensing chamber 18.

Figure 4:
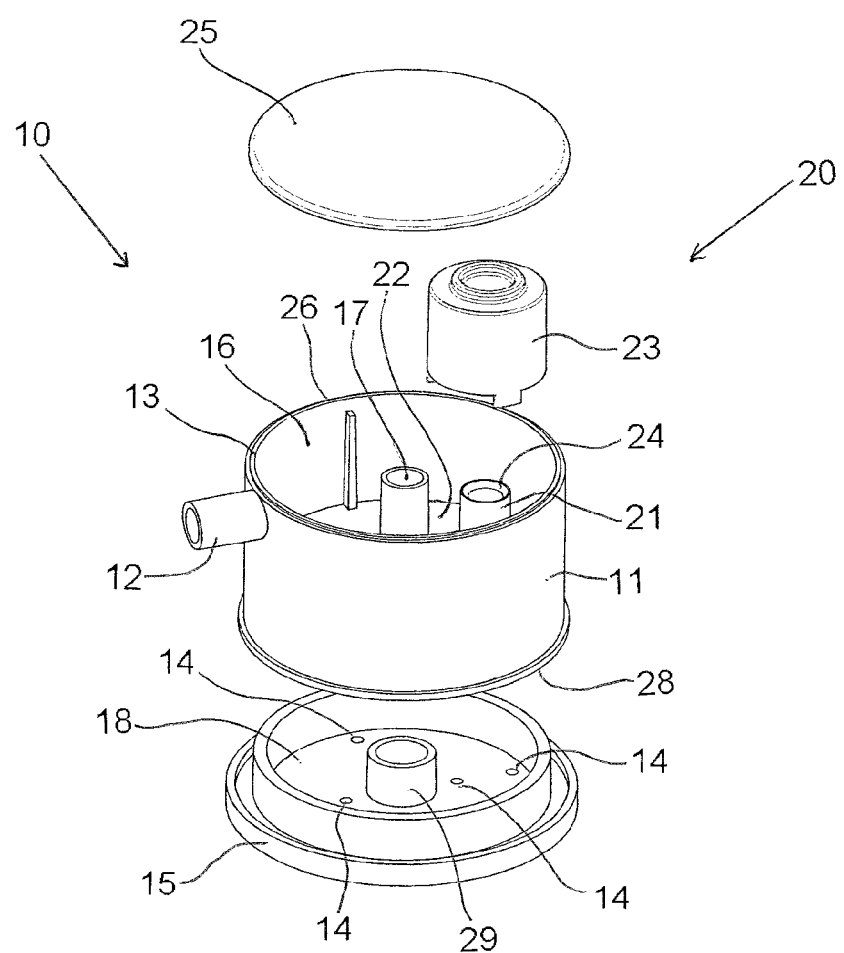
FIG. 4 is an exploded view of the sprayhead of FIG. 1.

Referring to FIG. 4 the sprayhead 10 is shown in an exploded view. The other end 15 of the housing 11 sits into bottom opening 28 of the housing 11 and the vent 17 locates in an open ended collar 29, mounted centrally in the other end 15.

Figure 5:
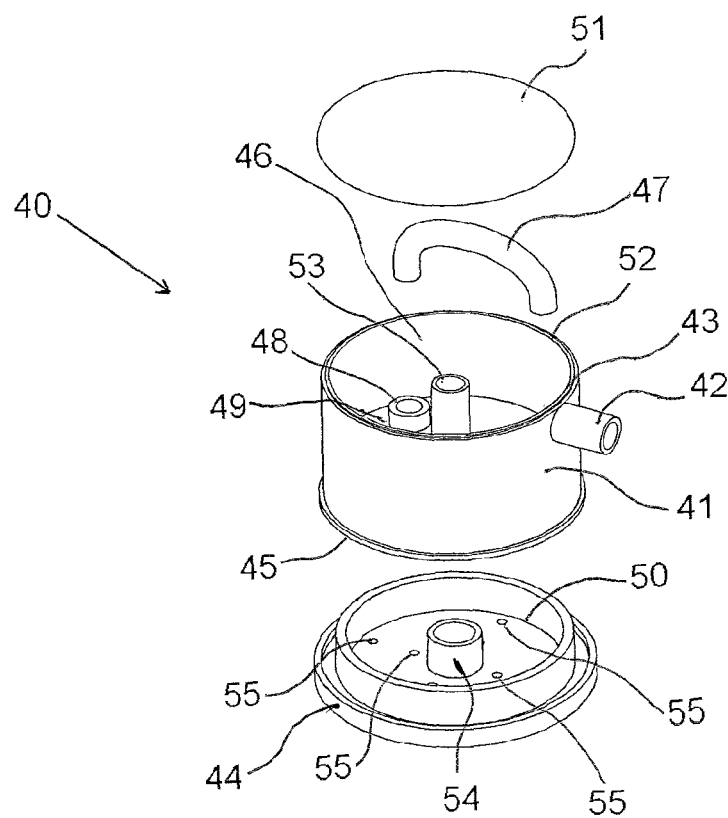
FIG. 5 is an exploded view of a second embodiment of the sprayhead in accordance with the invention.

Referring to FIG. 5, there is illustrated generally at 40, in an exploded view, a further embodiment of a sprayhead in accordance with the invention. The sprayhead 40 has a housing 41 with a water inlet 42 at one end 43 thereof. The other end 44 of the housing 41 sits into bottom opening 45 of the housing 41. A holding chamber 46 is located within the housing 41 and a siphon tube 47 is locatable in an opening 48 in bottom surface 49 of the holding chamber 46, which connects the holding chamber 46 with a dispensing chamber 50. A sprayhead cap 51 seals top end 52 of the housing 41.

A vent 53 is locatable in a central open ended collar 54 on the other end 44 of the housing 41. A plurality of spaced apart hot water outlets 55 are arranged at the other end 44 of the housing 41.

Figure 6:
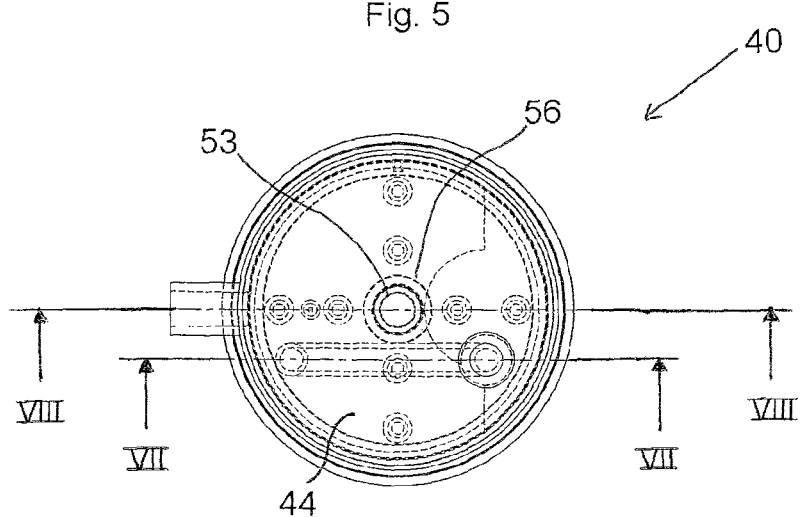
FIG. 6 is a plan view from above of the sprayhead of FIG. 5.

Referring to FIG. 6, which is a plan view from above of the sprayhead 40, the vent 53 can be seen positioned in the centre 56 of the other end 44.

Figure 7:
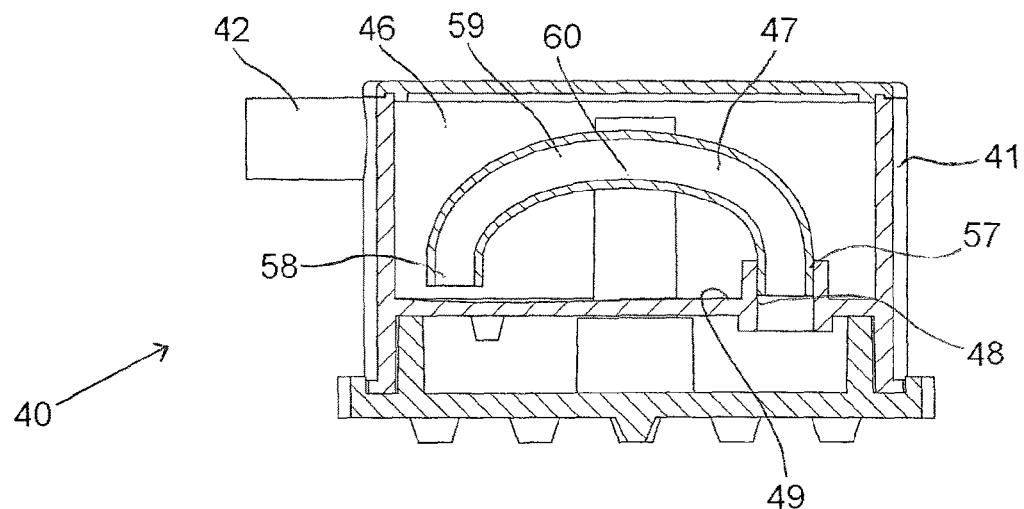
FIG. 7 is a section view on line VII-VII of FIG. 6.

Referring to FIG. 7, which is a section view on line VII-VII of FIG. 6, the position of the siphon tube 47 can be seen more clearly. The siphon tube 47 is located at one end 57 thereof in the opening 48 in the lower surface 49 of the holding chamber 46. The siphon tube 47 is open at other end 58 thereof, which open end 58 is located close to the bottom surface 49, with the siphon tube 47 curving in an arc 59 above the bottom surface 49, such that when the water level in the holding chamber 46 reaches the apex 60 of the arc 59, the siphon 47 will drain the accumulated water from the holding chamber 46 into the dispensing chamber 50, and thence to the coffee grounds.

Figure 8:
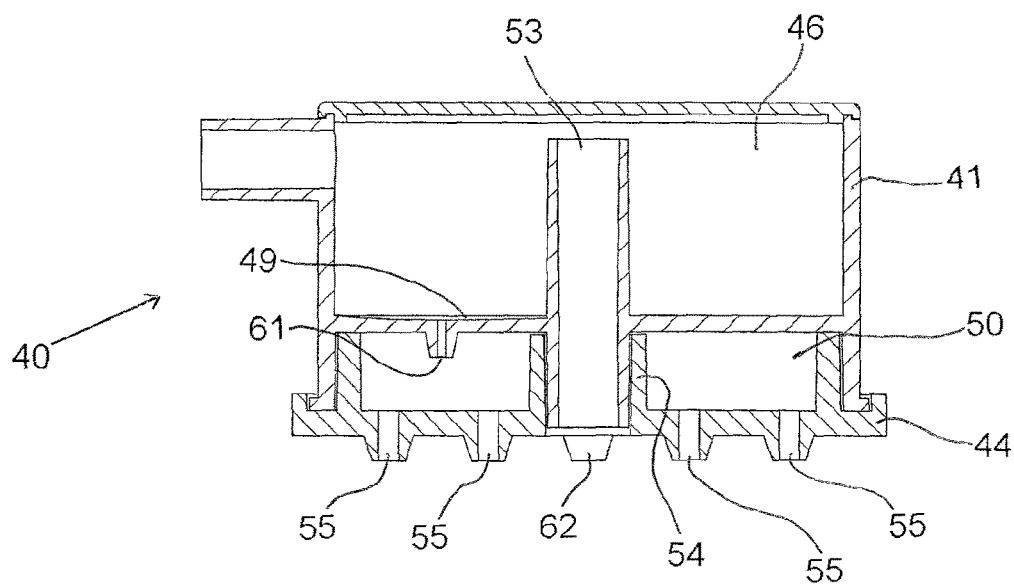
FIG. 8 is a section view on line VIII-VIII of FIG. 6.

Referring to FIG. 8, which is a section view on line VIII-VIII of FIG. 6, a drain 61 is mounted in the bottom surface 49 of the holding chamber 46 and connects the holding chamber 46 with the dispensing chamber 50, and thence through the hot water outlets 55 to the coffee grounds.

The vent 53 is locatable in a central open ended collar 54 on the other end 44 of the housing 41. The vent 53 is open to the atmosphere at end 62 thereof.

We claim:

1. A sprayhead for a coffee brewing machine, comprising:
   a holding compartment defined by a first cylindrical wall, the cylindrical wall including a fluid inlet port;
   a centrally disposed, tubular vent having open first and second ends, said first end disposed in the holding compartment and the second end disposed at an outlet to the sprayhead;
   a dispensing chamber disposed below the holding chamber defined by a second cylindrical wall, the dispensing chamber including a plurality of water outlets for spraying water from the sprayhead, the tubular vent passing through the dispensing chamber;
   a drain passage directly connecting the holding compartment to the dispensing chamber for fluid communication therebetween for evacuating any residual fluid in the holding compartment;
   a siphon tube connecting the holding compartment with the dispensing chamber, the siphon tube vertically arranged and having a first open end disposed within the holding compartment and below said first end of the tubular vent, and a second open end disposed within the dispensing chamber and above the second end of the tubular vent; and
   a removable siphon bell disposed over the siphon tube;
   wherein delivery of fluid from the holding compartment to the dispensing chamber through the siphon tube is controlled solely by a water level in the holding compartment above the first open end of the siphon tube without manual or mechanical intervention; and
   wherein dimensions of the holding compartment, dispensing chamber, and siphon tuber are selected to introduce a pause in the flow of fluid from the holding compartment to the dispensing chamber coinciding with an intermission between a wetting phase and an infusion phase of a brewing operation.

2. The sprayhead of claim 1, wherein a volume of the holding compartment can be adjusted by sliding a water displacing solid into the holding compartment.

\* \* \* \* \*